(12) United States Patent
Wang et al.

(10) Patent No.: US 11,659,173 B2
(45) Date of Patent: May 23, 2023

(54) METHOD AND CHIP FOR VERTICALLY FILTERING IMAGE

(71) Applicant: INSPUR SUZHOU INTELLIGENT TECHNOLOGY CO., LTD., Jiangsu (CN)

(72) Inventors: Hongliang Wang, Jiangsu (CN); Deshan Zhang, Jiangsu (CN); Qi Mou, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/780,248

(22) PCT Filed: Nov. 5, 2020

(86) PCT No.: PCT/CN2020/126767
§ 371 (c)(1),
(2) Date: May 26, 2022

(87) PCT Pub. No.: WO2021/164324
PCT Pub. Date: Aug. 26, 2021

(65) Prior Publication Data
US 2022/0417508 A1 Dec. 29, 2022

(30) Foreign Application Priority Data
Feb. 21, 2020 (CN) .......................... 202010108903.7

(51) Int. Cl.
*H04N 19/117* (2014.01)
*H04N 19/124* (2014.01)

(52) U.S. Cl.
CPC ......... *H04N 19/117* (2014.11); *H04N 19/124* (2014.11)

(58) Field of Classification Search
CPC .......................... H04N 19/117; H04N 19/124
(Continued)

(56) References Cited

U.S. PATENT DOCUMENTS

| 6,973,127 B1 | 12/2005 | Kolesnik et al. |
| 2002/0196260 A1 | 12/2002 | Candler et al. |

(Continued)

FOREIGN PATENT DOCUMENTS

| CN | 101286226 A | 10/2008 |
| CN | 101409833 A | 4/2009 |

(Continued)

OTHER PUBLICATIONS

International Search Report of corresponding PCT application PCT/CN2020/126767, dated Feb. 5, 2021, 5 pages.

(Continued)

*Primary Examiner* — Dominic D Saltarelli
(74) *Attorney, Agent, or Firm* — Cooper Legal Group, LLC

(57) ABSTRACT

Disclosed is a method and chip for vertically filtering an image, including: caching and reading image data; calling a filter to vertically filter the image data to obtain first filtered data; updating the image data according to the first filtered data, and judging whether a to-be-read row is the last row of the image data; if not, updating the to-be-read row to the next row of the to-be-read row, and returning to execute the step of caching the image data; and if so, determining the vertically filtered image data. In the present application, point-by-point feedback is changed to row-by-row feedback according to an algorithm principle of a digital recursive filter and the characteristics of an image chip.

8 Claims, 4 Drawing Sheets

(58) Field of Classification Search
USPC .................................................. 375/240.29
See application file for complete search history.

(56) References Cited

U.S. PATENT DOCUMENTS

2007/0121733 A1* 5/2007 Cheung ............... H04N 19/156
375/E7.189
2015/0178970 A1 6/2015 Pham

FOREIGN PATENT DOCUMENTS

| CN | 101416217 A | 4/2009 |
|---|---|---|
| CN | 101600049 A | 12/2009 |
| CN | 102456214 A | 5/2012 |
| CN | 104050635 A | 9/2014 |
| CN | 104240181 A | 12/2014 |
| CN | 106791877 A | 5/2017 |
| CN | 108369725 A | 8/2018 |
| CN | 109064424 A | 12/2018 |
| CN | 110517201 A | 11/2019 |
| CN | 111314579 A | 6/2020 |
| EP | 2073553 A1 | 6/2009 |

OTHER PUBLICATIONS

Written Opinion of International Searching Authority of corresponding PCT application PCT/CN2020/126767, dated Feb. 5, 2021, 9 pages.

First Office Action of corresponding CN priority application CN202010108903.7, dated Mar. 2, 2021, 9 pages.

Yan, Kaihan, "The Principle and Design of Deblocking Module in Video Compression Coding" «Chinese Master's Theses Full-text Database» entire document with English abstract, Oct. 15, 2010, 88 pages.

* cited by examiner

METHOD AND CHIP FOR VERTICALLY FILTERING IMAGE

The present application claims priority to Chinese Patent Application No. 202010108903.7, filed to the China Patent Office on Feb. 21, 2020, entitled "Method and Chip for Vertically Filtering Image", the entire contents of which are incorporated herein by reference.

FIELD

The present application relates to the field of vertical image filtering, and in particular, to a method and chip for vertically filtering an image.

BACKGROUND

The main function of Image Signal Processing (ISP) chips is to process signals output by front-end image sensors in real time, such as noise reduction and color correction. Also, ISP chips also have a series of functions such as increasing a focusing speed, realizing digital image stabilization, and extracting image characteristic values to achieve face recognition. At present, almost all smart phones on the market and processors of monitoring chips are integrated with ISP algorithm units, while a few manufacturers use customized independent ISP chips. ISP chips may be appreciated by large manufacturers because of its video image processing speed. That is, ISP chips may implement traditional software image processing algorithms through hardware chips, thereby greatly increasing the processing speed of video images. Video images are processed through ISP chips without inducing any delay appreciable by users.

At present, the output and input of recursive filters have a coupled feedback relationship in ISP chips. Recursive filters are divided into horizontal filters and vertical filters. The implementation principles and architectures of the two filters are different. According to the principles of digital recursive filters, image data output by filtering needs to be fed back point by point. In the field of video image chip processing, image data is input row by row and point by point. For recursive filtering in a horizontal direction, as long as a horizontal progressive window module with a feedback function is designed, recursive filters in the horizontal direction may be designed. However, for recursive filtering in a vertical direction, if point-by-point feedback is realized, the design difficulty will be greatly increased, and the processing speed (all chips have a back pressure function) will be reduced, thereby reducing the chip reliability and increasing the chip cost.

Therefore, how to increase the speed of vertically filtering an image by a chip so as to reduce the chip cost is a technical problem to be currently solved by a person skilled in the art.

SUMMARY

The object of the present application is to provide a method and chip for vertically filtering an image, which are intended to increase the speed of vertically filtering an image by a chip and reduce the chip cost.

In order to solve the above technical problem, the present application provides a method for vertically filtering an image. The method includes:

caching a preset number of rows of image data and reading a to-be-read row of image data, wherein the to-be-read row is a first row, not cached, in the image data;

calling a filter to vertically filter the preset number of rows of the image data and the to-be-read row of the image data to obtain first filtered data;

updating the image data according to the first filtered data, and judging whether the to-be-read row is last row of the image data;

if not, updating the to-be-read row to next row of the to-be-read row and returning to execute the step of caching the preset number of rows of the image data and reading the to-be-read row of the image data; or if so, calling the filter to vertically filter the preset number of rows of the image data and the to-be-read row of the image data to obtain second filtered data, and updating the image data according to the second filtered data to obtain the vertically filtered image data.

Optionally, the step of calling the filter to vertically filter of the preset number of rows of the image data and the to-be-read row of the image data to obtain first filtered data includes:

acquiring a filter order and determining a number of prepositive rows and a number of postpositive rows in a to-be-filtered row of the image data according to the filter order;

generating prepositive rows of the image data according to the preset number of rows of cached image data and determining postpositive rows of the image data according to of the preset number of rows of cached image data and the to-be-read row of the image data; and calling the filter to vertically filter the prepositive rows and the postpositive rows of the image data to obtain filtered data in the to-be-filtered row of the image data as the first filtered data.

Optionally, the step of updating the image data according to the first filtered data includes:

updating the to-be-filtered row of the image data to filtered data in the to-be-filtered row of the image data.

Optionally, the step of calling the filter to vertically filter the preset number of rows of the image data and the to-be-read row of the image data to obtain second filtered data includes:

acquiring a filter order and determining the number of prepositive rows and a number of postpositive rows in the to-be-filtered row of the image data according to the filter order;

generating prepositive rows of the image data according to the preset number of rows of cached image data and determining postpositive rows of the image data according to the preset number of rows of cached image data and the last row of the image data;

calling the filter to vertically filter the prepositive rows and the postpositive rows of the image data to obtain filtered data in the to-be-filtered row of the image data as the second filtered data.

Optionally, the step of updating the image data according to the second filtered data to obtain the vertically filtered image data includes:

judging whether the to-be-filtered row is the last row of the image data;

in response to that the to-be-filtered row not being the last row of the image data, updating the to-be-filtered row of the image data to the second filtered data, updating the to-be-filtered row to the next row of the to-be-filtered row, and returning to execute the step of generating the prepositive rows of the image data according to the preset number of rows of the cached image data and determining the postpositive rows of the image data according to the preset number of rows of the cached image data and the last row of the image data; or in response to that the to-be-filtered row being the last row of the image data, updating the last row of the image data to the second filtered data, and outputting updated image data.

Optionally, before the step of calling the filter to vertically filter the preset number of rows of the image data and the to-be-read row of the image data to obtain first filtered data, the method further includes:

acquiring parameters of the filter and quantizing the parameters of the filter.

Optionally, after the step of acquiring parameters of the filter and quantizing the parameters of the filter, the method further includes:

in response to receipt of a control beat number modification command, modifying a control beat number of the filter according to the control beat number modification command.

The present application also provides a chip for vertically filtering an image. The chip includes:

a caching module, configured to cache a preset number of rows of image data, and read a to-be-read row of image data, wherein the to-be-read row is a first row, not cached, in the image data;

a first calling module, configured to call a filter to vertically filter the preset number of rows of the image data and the to-be-read row of the image data to obtain first filtered data;

a judgment module, configured to update the image data according to the first filtered data, and judge whether the to-be-read row is last row of the image data;

an update module, configured to update, in response to that the to-be-read row being not the last row of the image data, the to-be-read row to next row of the to-be-read row, and return to execute the step of caching the preset number of rows of the image data and reading the to-be-read row of the image data; and a second calling module, configured to call, in response to that the to-be-read row being the last row of the image data, the filter to vertically filter the preset number of rows of the image data and the to-be-read row of the image data to obtain second filtered data, and update the image data according to the second filtered data to obtain the vertically filtered image data.

Optionally, the first calling module includes:

an acquisition unit, configured to acquire a filter order, and determine a number of prepositive rows and a number of postpositive rows in a to-be-filtered row of the image data according to the filter order;

a first determination unit, configured to generate prepositive rows of the image data according to the preset number of rows of cached image data, and determine postpositive rows of the image data according to the preset number of rows of cached image data and the to-be-read row of the image data;

a first calling unit, configured to call the filter to vertically filter the prepositive rows and the postpositive rows of the image data to obtain filtered data in the to-be-filtered row of the image data as the first filtered data.

Optionally, the judgment module includes:

a first update unit, configured to update the to-be-filtered row of the image data to filtered data in the to-be-filtered row of the image data.

The present application provides a method for vertically filtering an image, including: caching a preset number of rows of image data and reading a to-be-read row of image data, wherein the to-be-read row is a first row, not cached, in the image data; calling a filter to vertically filter the preset number of rows of the image data and the to-be-read row of the image data to obtain first filtered data; updating the image data according to the first filtered data, and judging whether the to-be-read row is last row of the image data; if not, updating the to-be-read row to next row of the to-be-read row and returning to execute the step of caching the preset number of rows of the image data and reading the to-be-read row of the image data; or if so, calling the filter to vertically filter the preset number of rows of the image data and the to-be-read row of the image data to obtain second filtered data, and updating the image data according to the second filtered data to obtain the vertically filtered image data.

In the technical solution provided by the present application, a filter is called to vertically filter a preset number of rows of image data and a to-be-read row of image data to obtain first filtered data. Then the image data is updated according to the first filtered data. Point-by-point feedback is changed to row-by-row feedback according to an algorithm principle of a digital recursive filter and the characteristics of an image chip. An algorithm realization architecture is optimized, the development efficiency is improved, and the maintenance time is reduced, thereby greatly increasing the speed of vertically filtering an image by a chip, and reducing the chip cost. The present application also provides a chip for vertically filtering an image, which has the above beneficial effects omitted herein.

BRIEF DESCRIPTION OF THE DRAWINGS

In order to more clearly illustrate the technical solutions in the embodiments of the present application or the prior art, the drawings needing to be used in the description of the embodiments or the prior art will be briefly introduced below. It is obvious that the drawings in the following description are merely the embodiments of the present application. A person ordinarily skilled in the art may also obtain other drawings according to the provided drawings without involving any inventive effort.

DETAILED DESCRIPTION OF THE INVENTION

The core of the present application is to provide a method and chip for vertically filtering an image, which are intended to increase the speed of vertically filtering an image by a chip and reduce the chip cost.

In order that the objects, technical solutions and advantages of the embodiments of the present application will become more apparent, the technical solutions in the embodiments of the present application will now be described clearly and completely with reference to the accompanying drawings in the embodiments of the present application. It is obvious that the described embodiments are merely some, but not all, embodiments of the present application. All other embodiments obtained by a person ordinarily skilled in the art based on the embodiments in the present application without involving creative efforts fall within the scope of protection of the present application.

At present, most of image processing algorithms in the field of digital chips are non-recursive filters. Such filters have no recursive feedback, and the data flow is easy to control, which is convenient for design and implementation. However, if the same effect is achieved, the order of the non-recursive filter is 5-10 times of the order of the recursive filter. Especially for processing filtration in a vertical direction, the required row cache is multiplied, which means that the chip cost is greatly increased. In addition, in this field, most of the architectures are not optimized enough during the design and implementation of filters at present. Especially in the vertical direction, a row cache is required. The design is particularly complex in case of the design requirements of recursive filters with feedback signals, and the maintenance cost is increased linearly. Therefore, the present application provides a method for vertically filtering an image, for solving the above problems.

Figure 1:
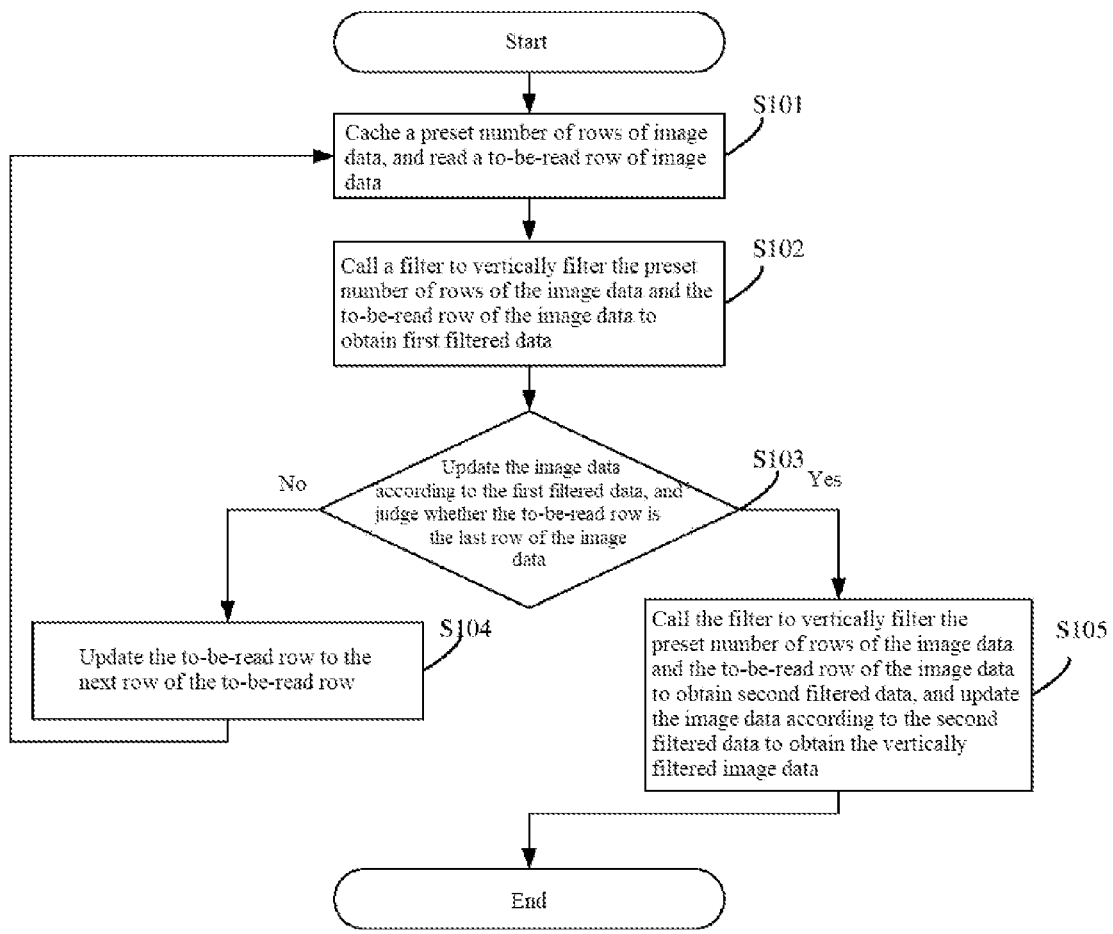
FIG. 1 is a flowchart of a method for vertically filtering an image according to an embodiment of the present application.

Referring to FIG. 1, FIG. 1 is a flowchart of a method for vertically filtering an image according to an embodiment of the present application.

The method specifically includes the following steps.

In S101, of a preset number of rows of image data is cached, and image data of a to-be-read row of image data is read.

The to-be-read row mentioned here is the first row, not cached, in the image data. Before vertically filtering image data, a chip will cache a preset number of rows of image data first, and then read image data which is not cached. Since the image data is read point by point according to rows, when the image data is vertically filtered, the image data at one point may be read while being processed in one column in order to increase the processing speed. Certainly, the to-be-read row of the image data may be read all and then vertically filtered. This is not specifically defined in the present application.

In S102, a filter is called to vertically filter the preset number of rows of the image data and the to-be-read row of the image data to obtain first filtered data.

Optionally, the preset number of rows of the image data mentioned here may specifically be the whole image data, i.e. the whole picture is completely cached.

Figure 2:
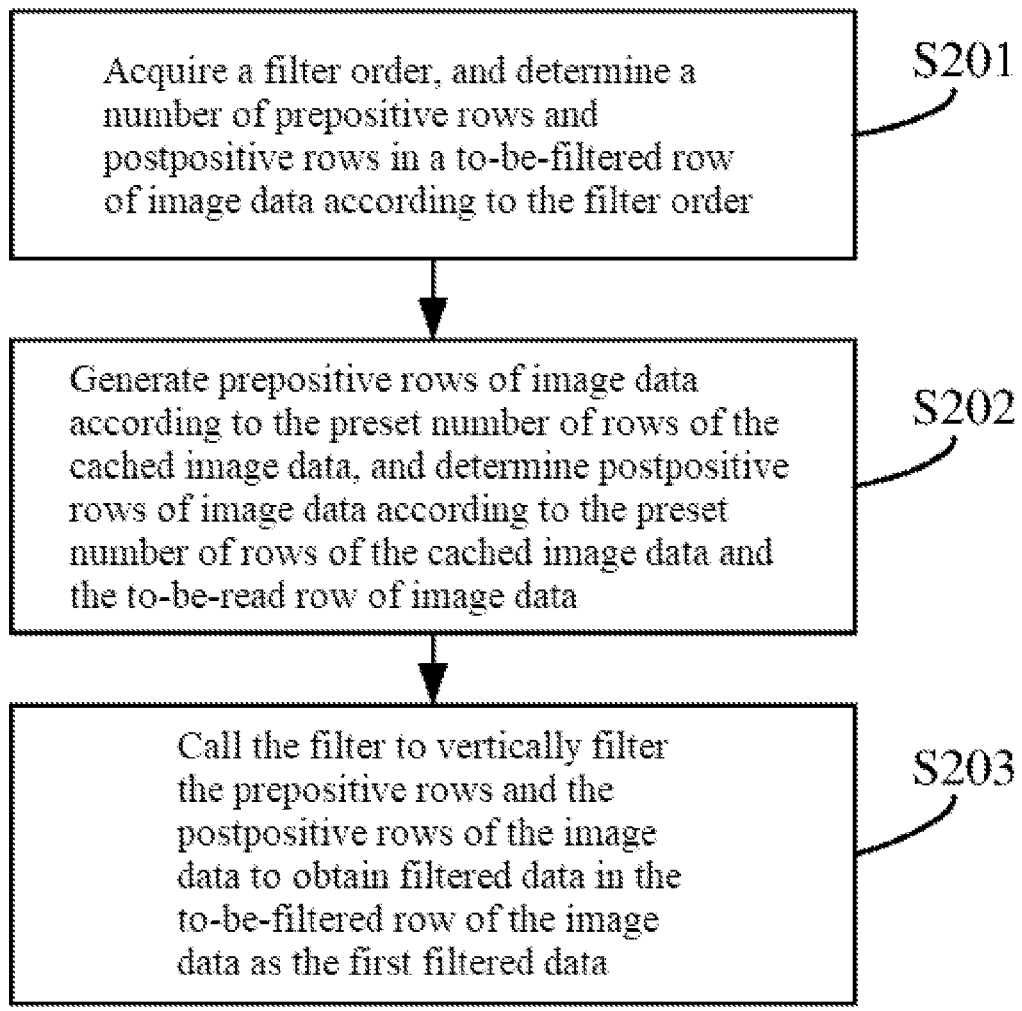
FIG. 2 is a flowchart of an actual expression of S102 in the method for vertically filtering an image in FIG. 1.

Preferably, in order to reduce the cache occupied by the image data, the step, mentioned here, of calling a filter to vertically filter the preset number of rows of the image data and the to-be-read row of the image data to obtain first filtered data may specifically be the step as shown in FIG. 2. Referring to FIG. 2 below, FIG. 2 is a flowchart of an actual expression of S102 in the method for vertically filtering an image in FIG. 1. This step specifically includes the following steps.

In S201, a filter order is acquired, and a number of prepositive rows and of postpositive rows in a to-be-filtered row of the image data are determined according to the filter order.

In an example of a 9-order filter, when an input row of the 9-order filter is rows 1-9 of the image data, the obtained filtered data is filtered data in row 5 of the image data, the to-be-filtered row mentioned here is row 5, prepositive rows of the to-be-filtered row are rows 1-4, and postpositive rows of the to-be-filtered row are rows 6-9.

In S202, prepositive rows of the image data is generated according to the preset number of rows of the cached image data, and postpositive rows of the image data is determined according to the preset number of rows of the cached image data and the to-be-read row of the image data.

When a to-be-filtered row is a boundary row or adjacent to a boundary row, there is a problem that image data is insufficient and filtering cannot be completed. In an example of a 9-order filter, when a to-be-filtered row is the first row, postpositive rows are rows 2-5, and prepositive rows are null, the present application may generate the prepositive rows of the image data according to the preset number of rows of the cached image data, i.e. the prepositive rows of the image data is all replaced with the first row of the image data.

In S203, the filter is called to vertically filter the prepositive rows and the postpositive rows of the image data to obtain filtered data in the to-be-filtered row of the image data as the first filtered data.

Preferably, before the step of calling a filter to vertically filter the preset number of rows of the image data and the to-be-read row of the image data to obtain first filtered data, parameters of the filter may also be acquired and quantized, so as to adjust the accuracy of the filter.

Further, after acquiring parameters of the filter and quantizing the parameters of the filter, when receiving a control beat number modification command, a control beat number of the filter is modified according to the control beat number modification command, so as to adjust the control beat number of the filter, thereby facilitating digital chip engineers to debug image quality filters.

In S103, the image data is updated according to the first filtered data, and it is judged whether the to-be-read row is the last row of the image data.

If not, the process proceeds to step S104. If so, the process proceeds to step S105.

Optionally, the step, mentioned here, of updating the image data according to the first filtered data may specifically be:

updating the to-be-filtered row of the image data to filtered data in the to-be-filtered row of the image data.

The image data needs to be vertically filtered in a vertical direction with very large row cache. In an example of a 9-order filter, if the image data needs to be vertically filtered, 9 rows of image data need to be cached at the same time. On this basis, if point-by-point feedback is then performed, the chip cost and occupied area would be greatly increased. Therefore, in the present application, a filter is called to vertically filter a preset number of rows of image data and a to-be-read row of image data to obtain first filtered data. The first filtered data is filtered data in a to-be-filtered row. That is, the image data is recursively vertically filtered by means of row-by-row feedback, thereby greatly reducing the chip cost and the occupied area.

In S104, the to-be-read row is updated to the next row of the to-be-read row.

When the to-be-read row is not the last row of the image data, it means that some data is still readable at this moment. At this moment, the to-be-read row is updated to the next row of the to-be-read row, and the process returns to step S101 to continue to calculate filtered data in the next to-be-filtered row of the image data.

In S105, the filter is called to vertically filter the preset number of rows of the image data and the to-be-read row of the image data to obtain second filtered data, and the image data is updated according to the second filtered data to obtain the vertically filtered image data.

When the to-be-read row is the last row of the image data, it means that no data is readable at this moment. At this moment, the filter is called to vertically filter the preset number of rows of the image data and the to-be-read row of the image data to obtain second filtered data, and the image data is updated according to the second filtered data to obtain the vertically filtered image data, thereby completing the current vertical image filtering processing.

Based on the above technical solution, according to the method for vertically filtering an image provided in the present application, a filter is called to vertically filter a preset number of rows of image data and a to-be-read row of image data to obtain first filtered data. Then the image data is updated according to the first filtered data. Point-by-point feedback is changed to row-by-row feedback according to an algorithm principle of a digital recursive filter and the characteristics of an image chip. An algorithm realization architecture is optimized, the development efficiency is improved, and the maintenance time is reduced, thereby greatly increasing the speed of vertically filtering an image by a chip, and reducing the chip cost.

In step S105 of the previous embodiment, the described operation of calling the filter to vertically filter the preset number of rows of the image data and the to-be-read row of the image data to obtain second filtered data will be described below in conjunction with FIG. 3.

Figure 3:
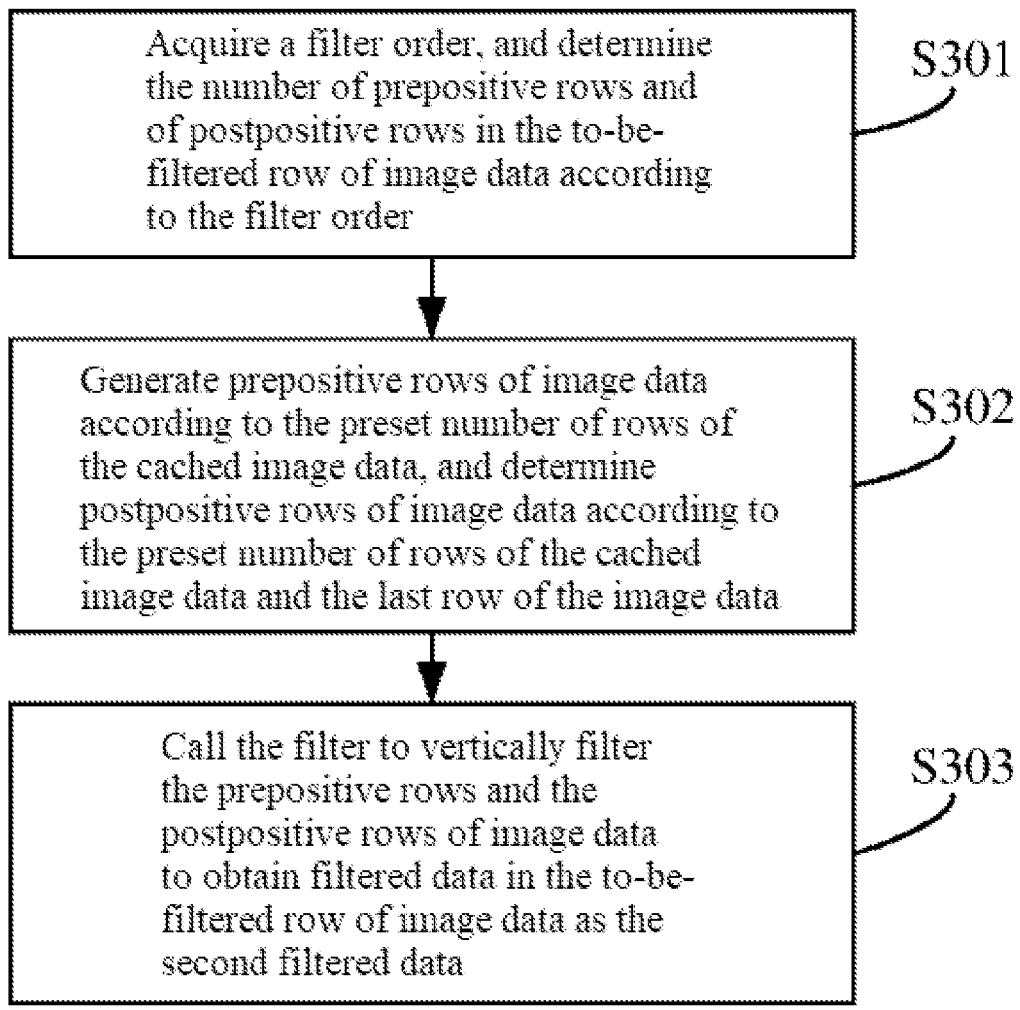
FIG. 3 is a flowchart of an actual expression of S105 in the method for vertically filtering an image in FIG. 1.

Referring to FIG. 3, FIG. 3 is a flowchart of an actual expression of S105 in the method for vertically filtering an image in FIG. 1.

This step specifically includes the following steps.

In S301, a filter order is acquired, and a number of prepositive rows and of postpositive rows in the to-be-filtered row of image data are determined according to the filter order.

In S302, prepositive rows of image data is generated according to the preset number of rows of the cached image data, and postpositive rows of image data is determined according to the preset number of rows of the cached image data and the last row of the image data.

In S303, the filter is called to vertically filter the prepositive rows and the postpositive rows of the image data to obtain filtered data in the to-be-filtered row of the image data as the second filtered data.

When a to-be-filtered row is a boundary row or adjacent to a boundary row, there is a problem that image data is insufficient and filtering cannot be completed. In an example of a 9-order filter, when a to-be-filtered row is the last row, prepositive rows are rows 2-5 from bottom, and postpositive rows are null, the present application may generate the postpositive rows of image data according to the preset number of rows of the cached image data, i.e. the postpositive rows of the image data is all replaced with the last row of image data.

On this basis, the operation, mentioned in step S105, of updating the image data according to the second filtered data to obtain the vertically filtered image data may specifically be:

judging whether the to-be-filtered row is the last row of the image data;

if not, updating the to-be-filtered row of the image data to the second filtered data, updating the to-be-filtered row to the next row of the to-be-filtered row, and returning to execute step S302;

if so, updating the last row of the image data to the second filtered data, and outputting the updated image data.

Figure 4:
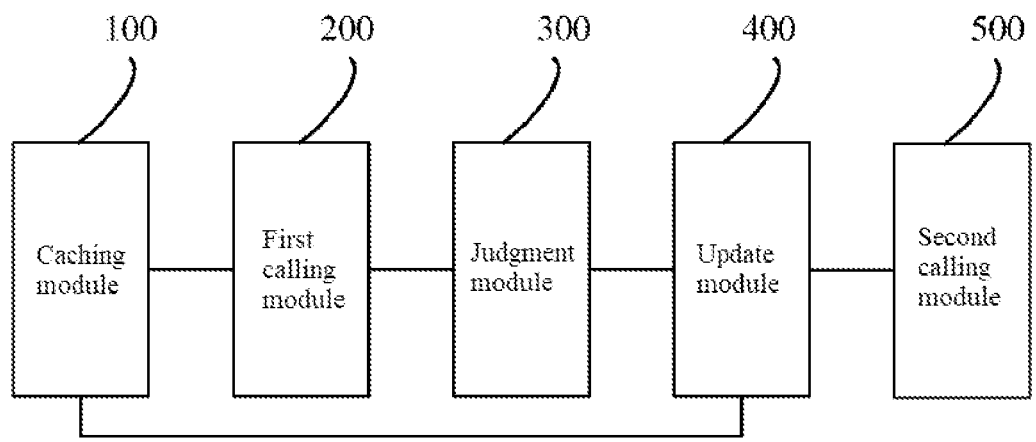
FIG. 4 is a structural diagram of a chip for vertically filtering an image according to an embodiment of the present application.

Referring to FIG. 4, FIG. 4 is a structural diagram of a chip for vertically filtering an image according to an embodiment of the present application.

The chip may include:

a caching module 100, configured to cache a preset number of rows of image data, and read a to-be-read row of image data, wherein the to-be-read row is the first row, not cached, in the image data;

a first calling module 200, configured to call a filter to vertically filter the preset number of rows of the image data and the to-be-read row of the image data to obtain first filtered data;

a judgment module 300, configured to update the image data according to the first filtered data, and judge whether the to-be-read row is the last row of the image data;

an update module 400, configured to update, when the to-be-read row is not the last row of the image data, the to-be-read row to the next row of the to-be-read row, and return to execute the step of caching, by the caching module 100, the preset number of rows of image data and reading the to-be-read row of image data;

a second calling module 500, configured to call, when the to-be-read row is the last row of the image data, the filter to vertically filter the preset number of rows of the image data and the to-be-read row of the image data to obtain second filtered data, and update the image data according to the second filtered data to obtain the vertically filtered image data.

On the basis of the above embodiment, as a preferred implementation, the first calling module 200 may further include:

an acquisition unit, configured to acquire a filter order, and determine the number of prepositive rows and of postpositive rows in a to-be-filtered row of image data according to the filter order;

a first determination unit, configured to generate prepositive rows of image data according to the preset number of rows of the cached image data, and determine postpositive rows of image data according to the preset number of rows of the cached image data and the to-be-read row of the image data;

a first calling unit, configured to call the filter to vertically filter the prepositive rows and the postpositive rows of the image data to obtain filtered data in the to-be-filtered row of the image data as the first filtered data.

On the basis of the above embodiment, as a preferred implementation, the judgment module 300 may further include:

a first update unit, configured to update the to-be-filtered row of the image data to filtered data in the to-be-filtered row to-be-filtered.

On the basis of the above embodiment, as a preferred implementation, the second calling module 500 may further include:

a second determination unit, configured to acquire a filter order, and determine the number of prepositive rows and of postpositive rows in the to-be-filtered row of image data according to the filter order;

a third determination unit, configured to generate prepositive rows of image data according to the preset number of rows of the cached image data, and determine postpositive rows of image data according to the preset number of rows of the cached image data and the last row of the image data;

a calling unit, configured to call the filter to vertically filter the prepositive rows and the postpositive rows of the image data to obtain filtered data in the to-be-filtered row of the image data as the second filtered data.

On the basis of the above embodiment, as a preferred implementation, the second calling module 500 may further include:

a judgment unit, configured to judge whether the to-be-filtered row is the last row of the image data;

a second update unit, configured to update, when the to-be-filtered row is not the last row of the image data, the to-be-filtered row of the image data to the second filtered data, update the to-be-filtered row to the next row of the to-be-filtered row, and return to execute the step of generating, by the third determination unit, prepositive rows of image data according to the preset number of rows of the cached image data and determining postpositive rows of image data according to the preset number of rows of the cached image data and the last row of the image data;

a third update unit, configured to update, when the to-be-filtered row is the last row of the image data, the last row of the image data to the second filtered data, and output the updated image data.

On the basis of the above embodiment, as a preferred implementation, the chip may further include:

a quantization module, configured to acquire parameters of the filter, and quantize the parameters of the filter.

On the basis of the above embodiment, as a preferred implementation, the chip may further include:

a modification module, configured to modify, when receiving a control beat number modification command, a control beat number of the filter according to the control beat number modification command.

Since the embodiment for the chip and the embodiment for the method correspond to each other, the embodiment for the chip may be referred to the description of the embodiment for the method. The descriptions thereof are omitted herein.

Figure 5:
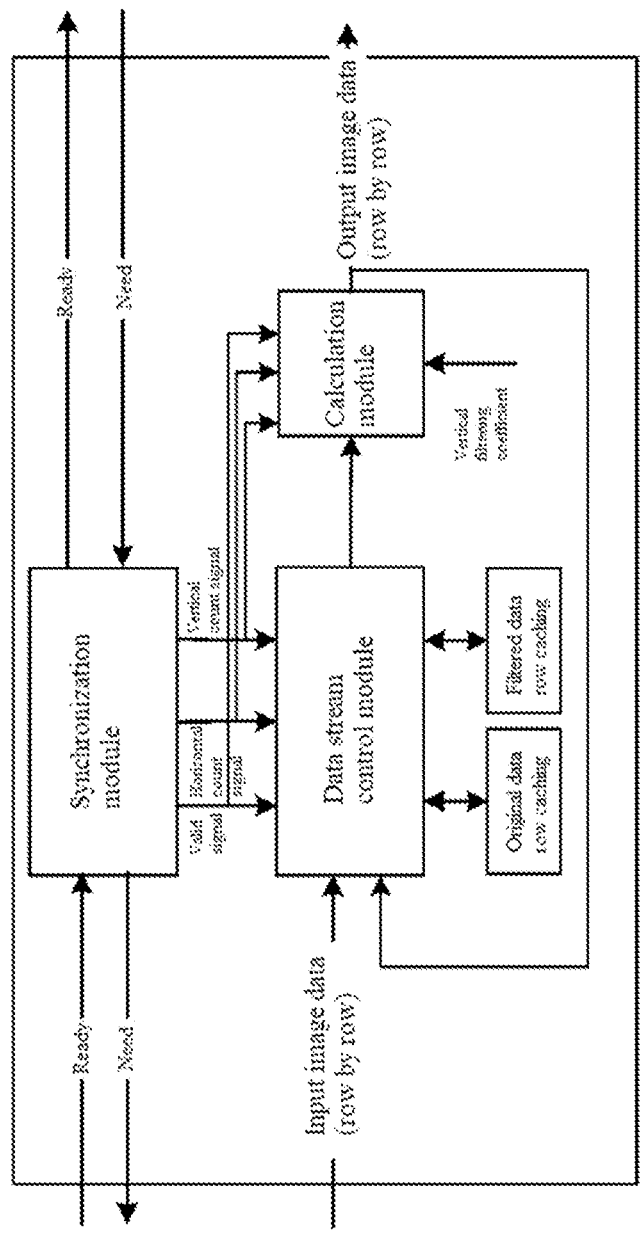
FIG. 5 is a structural diagram of another chip for vertically filtering an image according to an embodiment of the present application.

Preferably, referring to FIG. 5, FIG. 5 is a structural diagram of another chip for vertically filtering an image according to an embodiment of the present application.

As shown in FIG. 5, the chip may include a synchronization module, a data stream control module and a calculation module.

The synchronization module is configured to process a ready/need handshake signal. The ready signal represents that a superior module informs a subordinate module that data is ready, and the ready signal is highly valid. The need signal represents that the subordinate module informs the superior module that data may be received, and the need signal is highly valid. When both ready and need are high, data transfer, i.e. handshake, is completed once. In digital chip image processing algorithms, each algorithm will have a large number of controls and calculations. If each processing carries a handshake signal, the design will become extremely complex and difficult to maintain. Therefore, in the present application, this part is taken as a module to process separately. Parameter information is determined according to the width and height of an image. A ready/need handshake signal is converted into a valid signal, a horizontal count (h_cnt) signal and a vertical count (v_cnt) signal. The above three signals are used to control a data stream, and calculations may greatly reduce the complexity of design and control.

The data stream control module is configured to complete functions such as data cache control, data edge expansion control, and data selection and output control.

The calculation module is configured to complete multiplication and addition calculations of image data and coefficients.

Since the embodiment for the chip and the embodiment for the method correspond to each other, the embodiment for the chip may be referred to the description of the embodiment for the method. The descriptions thereof are omitted herein.

Various embodiments are described in the description in a progressive manner. Each embodiment focuses on differences from the other embodiments. The same or similar parts of the various embodiments may be referred to each other.

The method and chip for vertically filtering an image according to the present application has been described in detail above. The principles and implementations of the present application have been set forth herein using specific examples, which have been set forth only to aid in the understanding of the method and core ideas of the present application. It should be noted that a person ordinarily skilled in the art may make numerous improvements and modifications to the present application without departing from the principles of the present application. Such improvements and modifications are intended to be within the scope of the appended claims of the present application.

It should also be noted that relational terms such as first and second in the present description are used solely to distinguish one entity or operation from another without necessarily requiring or implying any actual relationship or order between such entities or operations. Moreover, the terms "include", "contain", or any other variations thereof are intended to cover a non-exclusive inclusion, such that a process, method, article, or device including a series of elements not only includes those elements, but also includes other elements that are not explicitly listed, or also includes elements inherent to such process, method, article, or device. It is not excluded, without more constraints, that additional identical elements exist in the process, method, article, or device including elements defined by a sentence "including a . . . ".

What is claimed is:

1. A method for vertically filtering an image, comprising:
    caching a preset number of rows of image data and reading a to-be-read row of the image data, wherein the to-be-read row is a first row, not cached, in the image data;
    calling a filter to vertically filter the preset number of rows of the image data and the to-be-read row of the image data to obtain first filtered data, wherein the step of calling the filter to vertically filter the preset number of rows of the image data and the to-be-read row of the image data to obtain the first filtered data, comprises:
        acquiring a filter order and determining a number of prepositive rows and a number of postpositive rows in a to-be-filtered row of the image data according to the filter order;
        generating prepositive rows of the image data according to the preset number of rows of cached image data, and determining postpositive rows of the image data according to the preset number of rows of the cached image data and the to-be-read row of the image data; and
        calling the filter to vertically filter the prepositive rows and the postpositive rows of the image data to obtain filtered data in the to-be-filtered row of the image data as the first filtered data;
    updating the image data according to the first filtered data, and judging whether the to-be-read row is a last row of the image data;

in response to the to-be-read row not being the last row of the image data, updating the to-be-read row to a next row of the to-be-read row, and returning to execute the step of caching the preset number of rows of the image data and reading the to-be-read row of the image data; and in response to the to-be-read row being the last row of the image data, calling the filter to vertically filter the preset number of rows of the image data and the to-be-read row of the image data to obtain second filtered data, and updating the image data according to the second filtered data to obtain vertically filtered image data.

2. The method according to claim 1, wherein the step of updating the image data according to the first filtered data comprises:

updating the to-be-filtered row of the image data to the filtered data in the to-be-filtered row of the image data.

3. The method according to claim 1, wherein the step of calling the filter to vertically filter the preset number of rows of the image data and the to-be-read row of the image data to obtain the second filtered data comprises:

acquiring the filter order and determining the number of prepositive rows and the number of postpositive rows in the to-be-filtered row of the image data according to the filter order;

generating the prepositive rows of the image data according to the preset number of rows of the cached image data, and determining the postpositive rows of the image data according to the preset number of rows of the cached image data and the last row of the image data; and calling the filter to vertically filter the prepositive rows and the postpositive rows of the image data to obtain the filtered data in the to-be-filtered row of the image data as the second filtered data.

4. The method according to claim 3, wherein the step of updating the image data according to the second filtered data to obtain the vertically filtered image data comprises:

judging whether the to-be-filtered row is the last row of the image data;

in response to the to-be-filtered row not being the last row of the image data, updating the to-be-filtered row of the image data to the second filtered data, updating the to-be-filtered row to the next row of the to-be-filtered row, and returning to execute the step of generating the prepositive rows of the image data according to the preset number of rows of the cached image data and determining the postpositive rows of the image data according to the preset number of rows of the cached image data and the last row of the image data; and in response to the to-be-filtered row being the last row of the image data, updating the last row of the image data to the second filtered data, and outputting updated image data.

5. The method according to claim 1, wherein before the step of calling the filter to vertically filter the preset number of rows of the image data and the to-be-read row of the image data to obtain the first filtered data, the method further comprises:

acquiring parameters of the filter and quantizing the parameters of the filter.

6. The method according to claim 5, wherein after the step of acquiring the parameters of the filter and quantizing the parameters of the filter, the method further comprises:

in response to receipt of a control beat number modification command, modifying a control beat number of the filter according to the control beat number modification command.

7. A chip for vertically filtering an image, comprising:

a caching module, configured to cache a preset number of rows of image data, and read a to-be-read row of the image data, wherein the to-be-read row is a first row, not cached, in the image data;

a first calling module, configured to call a filter to vertically filter the preset number of rows of the image data and the to-be-read row of the image data to obtain first filtered data, wherein the first calling module comprises:

an acquisition unit, configured to acquire a filter order, and determine a number of prepositive rows and a number of postpositive rows in a to-be-filtered row of the image data according to the filter order;

a first determination unit, configured to generate prepositive rows of the image data according to the preset number of rows of cached image data, and determine postpositive rows of the image data according to the preset number of rows of the cached image data and the to-be-read row of the image data; and a first calling unit, configured to call the filter to vertically filter the prepositive rows and the postpositive rows of the image data to obtain filtered data in the to-be-filtered row of the image data as the first filtered data;

a judgment module, configured to update the image data according to the first filtered data, and judge whether the to-be-read row is a last row of the image data;

an update module, configured to update, in response to the to-be-read row not being the last row of the image data, the to-be-read row to a next row of the to-be-read row, and return to execute the step of caching, by the caching module, the preset number of rows of the image data and reading the to-be-read row of the image data; and a second calling module, configured to call, in response to the to-be-read row being the last row of the image data, the filter to vertically filter the preset number of rows of the image data and the to-be-read row of the image data to obtain second filtered data, and update the image data according to the second filtered data to obtain vertically filtered image data.

8. The chip according to claim 7, wherein the judgment module comprises:

a first update unit, configured to update the to-be-filtered row of the image data to the filtered data in the to-be-filtered row of the image data.

* * * * *